United States Patent [19]

Sakaguchi et al.

[11] Patent Number: 5,728,026
[45] Date of Patent: Mar. 17, 1998

[54] CONTROL SYSTEM FOR AUTOMATIC TRANSMISSION

[75] Inventors: Yoshikazu Sakaguchi; Muneo Kusafuka, both of Anjo; Masao Saito; Masamichi Unoki, both of Nishio; Junichi Nishimura, Anjo, all of Japan

[73] Assignee: Aisin AW Co., Ltd., Anjo, Japan

[21] Appl. No.: 663,980

[22] Filed: Jun. 14, 1996

[30] Foreign Application Priority Data

Jun. 16, 1995 [JP] Japan ................... 7-150374

[51] Int. Cl.$^6$ .................................. F16H 61/16
[52] U.S. Cl. ................... 479/110; 477/107; 477/120
[58] Field of Search ................... 477/107, 110, 477/120, 901, 904, 905; 364/424.694, 431.07

[56] References Cited

U.S. PATENT DOCUMENTS

| | | |
|---|---|---|
| 5,047,950 | 9/1991 | Fritsch et al. |
| 5,076,116 | 12/1991 | Sasaki ................... 477/120 |
| 5,086,666 | 2/1992 | Moriki ................... 477/109 |
| 5,191,953 | 3/1993 | Ito et al. ................... 477/107 X |
| 5,231,897 | 8/1993 | Morita ................... 477/120 |
| 5,317,937 | 6/1994 | Yoshizawa et al. |
| 5,405,302 | 4/1995 | Yagi et al. ................... 477/107 |
| 5,555,170 | 9/1996 | Nakashima ................... 477/120 X |
| 5,558,598 | 9/1996 | Torimoto ................... 477/110 |
| 5,611,753 | 3/1997 | Kondo et al. ................... 477/120 X |

FOREIGN PATENT DOCUMENTS

| | | |
|---|---|---|
| 0 574 664 A1 | 12/1993 | European Pat. Off. |
| A-61-45160 | 3/1986 | Japan. |
| A-5-149425 | 6/1993 | Japan. |

*Primary Examiner*—Khoi Q. Ta
*Assistant Examiner*—Peter T. Kwon
*Attorney, Agent, or Firm*—Oliff & Berridge, PLC

[57] ABSTRACT

A control system for an automatic transmission having a running status detector for detecting the running status of a vehicle to include an input torque from the engine; a running resistance estimator for estimating a running resistance on the basis of the running status of the vehicle; and shift characteristic changer for changing shift characteristics in accordance with the running resistance of the vehicle. The control system further comprises an engine output controller for reducing the output of the engine by a sub-throttle valve which acts independently of the driver at an overrun time of drive wheels; and an action status detector for detecting the action status of the sub-throttle valve. The running resistance estimator estimates the running resistance of the vehicle on the basis of the running status detector and the action status detector of the sub-throttle valve.

5 Claims, 7 Drawing Sheets

| ENGINE OUTPUT TORQUE | | | | | |
|---|---|---|---|---|---|
| ENGINE RPM \ MAIN THROTTLE OPEN % | 0 | 11.1 | 16.7 | 22.2 | ... |
| 1000 | 5 | 70 | 100 | 115 | ... |
| 1500 | 0 | 60 | 95 | 120 | ... |
| 2000 | 0 | 55 | 85 | 115 | ... |
| 2500 | 0 | 40 | 75 | 110 | ... |
| 3000 | 0 | 35 | 50 | 90 | ... |
| ... | ... | ... | ... | ... | ... |

FIG. 7

| ENGINE OUTPUT TORQUE | | | | | |
|---|---|---|---|---|---|
| ENGINE RPM \ SUB-THROTTLE OPEN % | 0 | 11.1 | 16.7 | 22.2 | ... |
| 1000 | 5 | 70 | 100 | 115 | ... |
| 1500 | 0 | 60 | 95 | 120 | ... |
| 2000 | 0 | 55 | 85 | 115 | ... |
| 2500 | 0 | 40 | 75 | 110 | ... |
| 3000 | 0 | 35 | 50 | 90 | ... |
| ... | ... | ... | ... | ... | ... |

FIG. 8

| TORQUE RATIO | |
|---|---|
| SPEED RATIO | TORQUE RATIO |
| 0 | 2.5 |
| 0.1 | 2.0 |
| 0.2 | 1.9 |
| 0.3 | 1.8 |
| 0.4 | 1.6 |
| 0.5 | 1.5 |
| 0.6 | 1.3 |
| 0.7 | 1.2 |
| 0.8 | 1.0 |
| 0.9 | 1.0 |
| 1.00 | 1.0 |

RUN RESISTANCE MAP

| VEHICLE SPEED | 0 | 10 | 20 | 30 | 40 | 50 | 60 | 70 | 80 | 90 | 100 | ... |
|---|---|---|---|---|---|---|---|---|---|---|---|---|
| RUN RESIST FLAT ROAD | 265 | 270 | 280 | 300 | 330 | 360 | 400 | 460 | 520 | 580 | 660 | ... |

FIG.11

LOSS MAP

| GEAR RATIO | 1ST | 2ND | 3RD | 4TH |
|---|---|---|---|---|
| GEAR LOSS | 39.0 | 35.5 | 41.5 | 45.5 |

FIG.12

BASE OFFSET

| GEAR STAGE \ THROTTLE OPENING % | 0 | 10 | 20 | 30 | 40 | 50 | ... |
|---|---|---|---|---|---|---|---|
| 2ND | 0 | 0 | 0 | 0.2 | 0.3 | 0.4 | ... |
| 3RD | 0 | 0 | 0 | 0.1 | 0.2 | 0.3 | ... |
| 4TH | 0 | 0 | 0 | 0.1 | 0.2 | 0.2 | ... |

CONTROL SYSTEM FOR AUTOMATIC TRANSMISSION

BACKGROUND OF THE INVENTION

1. Field of the Invention

The invention relates to a control system for an automatic transmission to be mounted on a vehicle.

2. Description of Related Art

In the automatic transmission of the prior art, a gear change is effected according to predetermined shift characteristics. However, these shift characteristics are determined on the basis of an ordinary running status so that they cannot always satisfy the driver for the road gradient situations of uphill or downhill roads, for example.

In order to achieve a gear change matching the road gradient situations of uphill or downhill roads, therefore, there has been proposed the so-called "hill control" (as disclosed in Japanese Patent Laid-Open No. 45160/1986) for changing the shift characteristics according to the road gradient situations, as decided from a running resistance, by estimating the running resistance from the running status of a vehicle including an input torque coming from the engine. Moreover, the input torque from the engine is generally computed on the basis of the throttle opening and the engine RPM.

In the aforementioned hill control, the running resistance of the vehicle has to be accurately estimated to correspond to the road gradient situations. In the vehicle which is equipped with a control unit for the so-called "traction control" to suppress the slippage of drive wheels, however, the engine output is reduced independently of the throttling operation of the driver during the operation of the traction control unit, so that the running resistance of the vehicle cannot be accurately estimated to mistake the hill control by the aforementioned control method of the prior art. Thus, there has been proposed a technique (as disclosed in Japanese Patent Laid-Open No. 149425/1993) for preventing the erroneous estimation of the running resistance by interrupting the aforementioned hill control during the operation of the traction control unit.

In this shift control method of the prior art, however, the hill control is interrupted during the operation of the traction control unit. This may increase not only the possibility of deteriorating the intrinsic functions of the control, but also the response delay in the decision of the hill road just after the operation of the traction control unit.

SUMMARY OF THE INVENTION

In order to solve the above-specified problem, therefore, the invention has noted that the engine output control at the slipping time of the drive wheels is effected by the sub-throttle valve, and has an object to provide a control system for an automatic transmission, which is enabled to estimate the running resistance of a vehicle accurately thereby to effect a proper shift control during the traction control operation by computing an input torque on the basis of not only the main throttle opening information coming from a main throttle opening sensor, but the sub-throttle opening information coming from a sub-throttle opening sensor.

In order to achieve the above-specified object, according to the invention, (1) there is provided a control system for an automatic transmission, comprising running status detecting means for detecting the running status of a vehicle, including an input torque from an engine; running resistance estimating means for estimating a running resistance on the basis of the running status of the vehicle; and shift characteristic changing means for changing shift characteristics in accordance with the running resistance of the vehicle, characterized by further comprising engine output control means for reducing the output of the engine by a sub-throttle valve which acts independently of the driver at an overrun time of the drive wheels; and action status detecting means for detecting the action status of the sub-throttle valve; and in that the running resistance estimating means estimates the running resistance of the vehicle on the basis of the running status detecting means and the action status detecting means of the sub-throttle valve during the operation of the engine output control means.

(2) A control system for an automatic transmission as set forth in item (1) is characterized by further comprising reference acceleration computing means for computing the acceleration of the vehicle on a flat road based on the running status of the vehicle; actual acceleration computing means for computing the actual acceleration of the vehicle based on the running status of the vehicle; and running resistance comparing means for comparing the estimated running resistance and a preset reference value; in that the running resistance estimating means estimates the running resistance of the vehicle on the basis of the reference acceleration and the actual acceleration; and in that the shift characteristics changing means changes shift characteristics in accordance with the result of the comparison by the running resistance comparing means.

(3) There is also provided a control system for an automatic transmission, comprising reference acceleration computing means for determining the input torque of an engine based on the throttle opening of a main throttle and an engine RPM thereby to compute the acceleration of the vehicle for a flat road on the basis of the input torque; actual acceleration computing means for computing the actual acceleration of the vehicle on the basis of a signal from a vehicle speed sensor; running resistance estimating means for estimating the running resistance of the vehicle on the basis of the reference acceleration and the actual acceleration; running resistance comparing means for comparing the estimated running resistance and a preset reference value; and shift characteristics changing means for changing shift characteristics in accordance with the result of the comparison by the running resistance comparing means. The automatic transmission control system further comprises engine output control means for reducing the output of the engine by a sub-throttle valve which acts independently of the operation of the driver at an overrun of the drive wheels; and action status detecting means for detecting the action status of the sub-throttle valve. During the action of the engine output control means, the reference acceleration computing means computes the reference acceleration from the throttle opening of the sub-throttle and the engine RPM. The running resistance estimating means estimates the running resistance of the vehicle on the basis of the reference acceleration, as computed on the basis of the input torque determined based on the throttle opening of the sub-throttle and the engine RPM, and the actual acceleration.

(4) In a control system for an automatic transmission as set forth in item (2) or (3) above, the reference acceleration is computed by weighting and averaging the preceding reference accelerations and the present reference acceleration, and the actual acceleration is computed by weighting and averaging the preceding actual accelerations and the present actual acceleration.

BRIEF DESCRIPTION OF THE ACCOMPANYING DRAWINGS

The invention will be described with reference to the drawings in which:

3

FIG. 7 is an exemplary mapping of engine output torque under ordinary conditions;

FIG. 8 is an exemplary mapping of engine output torque during traction control;

FIG. 9 is an exemplary mapping of the torque ratio based on the speed ratio;

FIG. 10 is a run resistance map;

FIG. 11 is an exemplary map for determining gear loss; and

FIG. 12 is an exemplary map for determining a base offset.

DESCRIPTION OF THE PREFERRED EMBODIMENT

Here will be described the structure of a control system for an automatic transmission according to an embodiment of the invention.

Figure 1:
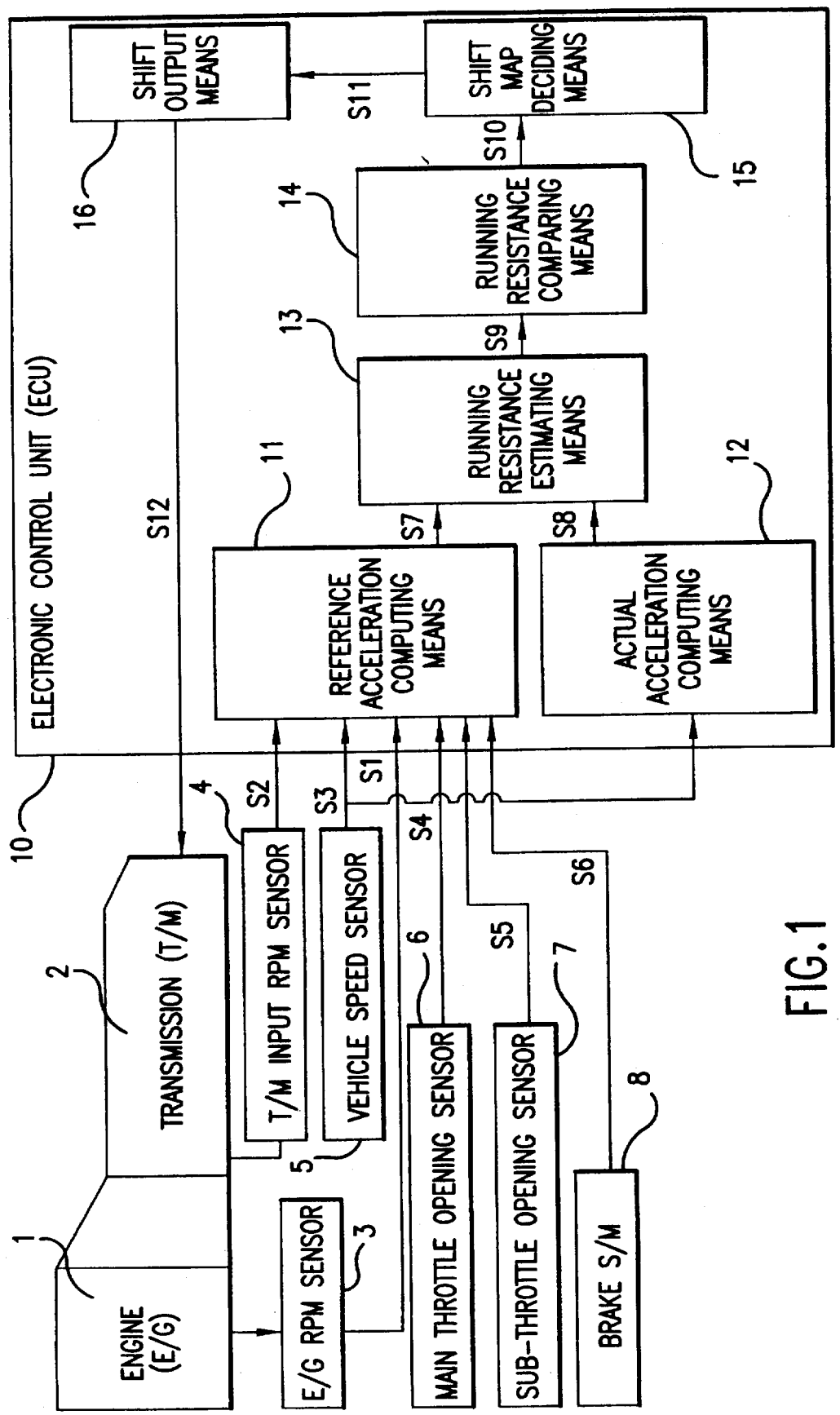
FIG. 1 is a schematic structure diagram showing a control system for an automatic transmission according to an embodiment of the invention.

As shown in FIG. 1, a transmission (T/M) 2 is connected to an engine (E/G) 1 through a torque converter (unnumbered). The RPM of the E/G 1 is detected by an E/G RPM sensor 3 so that an E/G RPM signal $S_1$ is output from the E/G RPM sensor 3 and input to reference acceleration computing means 11 in an electronic control unit (ECU) 10.

On the other hand, the RPMs relating to the T/M 2 are detected by a T/M input RPM sensor 4 so that a T/M input RPM signal $S_2$ is output from the T/M input RPM sensor 4 and input to the reference acceleration computing means 11. A vehicle speed signal $S_3$ is output from a vehicle speed sensor 5 and input to the reference acceleration computing means 11 and actual acceleration computing means 12, also found in the ECU 10.

Moreover, a main throttle opening signal $S_4$, a sub-throttle opening signal $S_5$ and a brake switch signal $S_6$ are output from a main throttle opening sensor 6, a sub-throttle opening sensor 7 and a brake switch 8, respectively, and are individually input to the reference acceleration computing means 11.

On the other hand, the reference acceleration computing means 11 is connected with running resistance estimating means 13 of the ECU 10, which is fed with information $S_7$ from the reference acceleration computing means 11 and information $S_8$ from the actual acceleration computing means 12 so that it estimates the running resistance. The running resistance estimating means 13 is connected to running resistance comparing means 14 which determines whether the road is a hill or a flat road, on the basis of information $S_9$ coming from the running resistance estimating means 13.

4

The running resistance comparing means 14 is connected to a shift map deciding means 15 for determining the shift map on the basis of decision information $S_{10}$, indicating whether the road is a hill or a flat road, from the running resistance comparing means 14. The shift output means 16 is connected with the shift map deciding means 15 and outputs shift information $S_{12}$ on the basis of decision information $S_{11}$ coming from the shift map deciding means 15 so that it controls the T/M 2 to effect the automatic change control on the basis of the shift information $S_{12}$.

With the structure described above, the engine output torque is ordinarily determined from the map, see FIG. 7 for an exemplary map, in terms of the E/G RPM on the basis of the main throttle opening signal $S_4$ coming from the main throttle opening sensor 6. At the traction control time, on the other hand, the engine output torque is determined from the map, see FIG. 8 for an exemplary map, in terms of the E/G RPM on the basis of the sub-throttle opening signal $S_5$ coming from the sub-throttle opening sensor 7 in place of the main throttle opening signal $S_4$ coming from the main throttle opening sensor 6.

As a result, the road situation can be accurately estimated even at the traction control time so that a reliable shift map changing control can be effected. In other words, the running resistance of the vehicle can be accurately estimated to effect a proper shift control during the traction control action.

Figure 2:
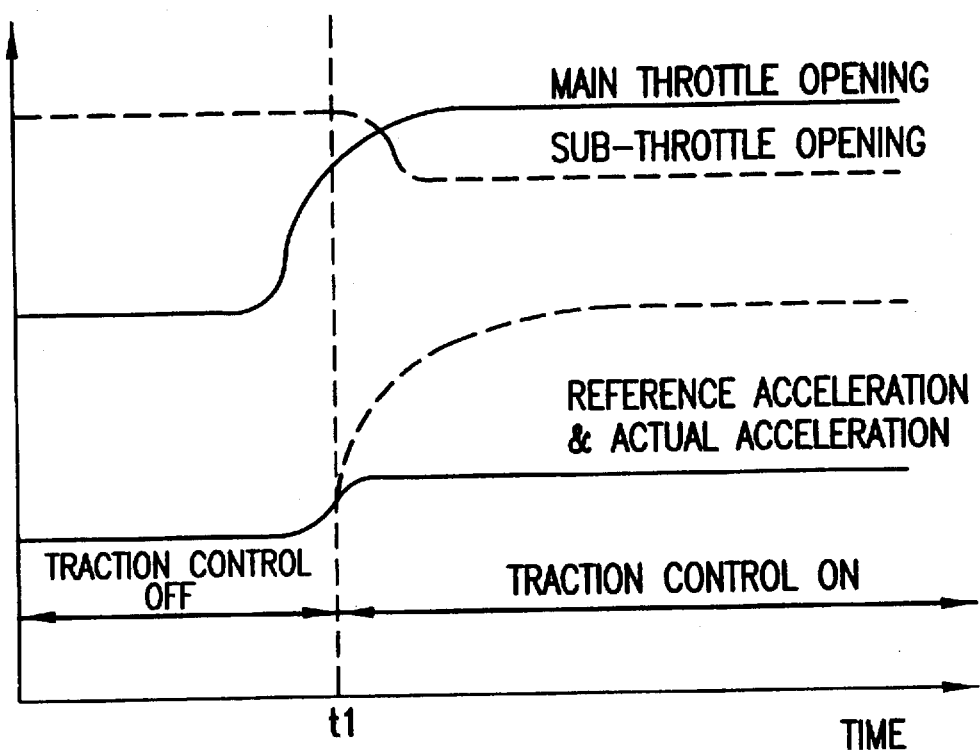
FIG. 2 is a control timing chart showing the control system for an automatic transmission according to the embodiment of the invention.

According to the invention, for example, the reference acceleration is computed on the basis of both the main throttle and the sub-throttle opening, as shown in FIG. 2. When the traction control is switched, at time $t_1$, from OFF to ON, the sub-throttle opening decreases. In accordance with this, the reference acceleration is computed to be a value as low as that of the actual acceleration so that the shift map changing control is executed.

Figure 6:
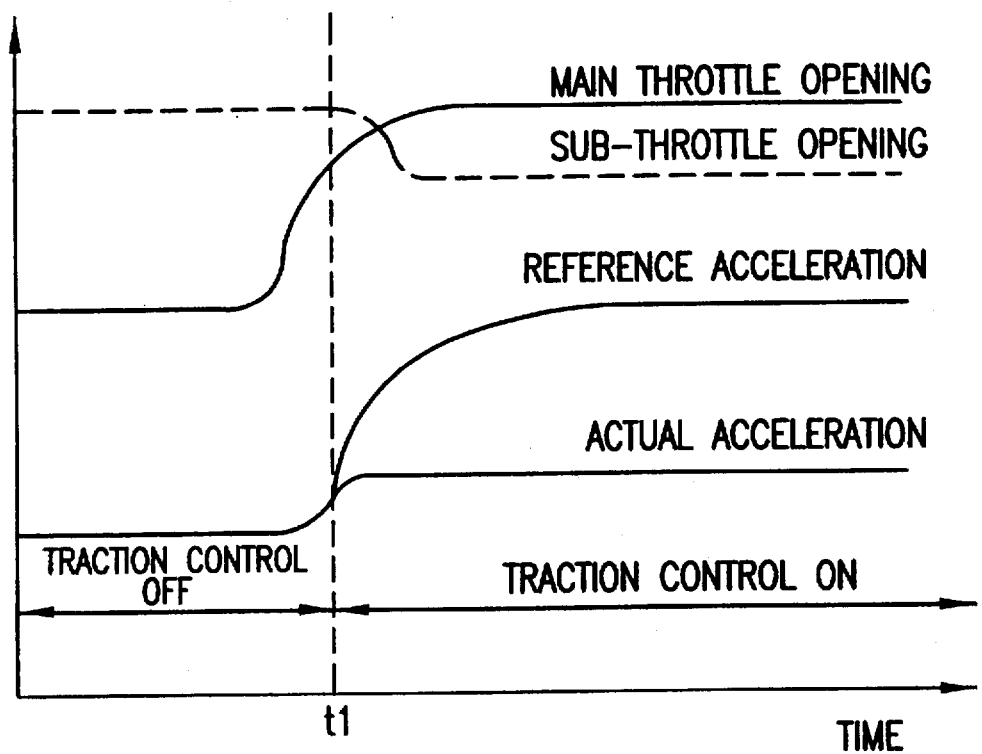
FIG. 6 is a control timing chart by the control system for an automatic transmission of the prior art.

Incidentally, in the prior art, the reference acceleration is computed exclusively by use of the main throttle opening, as shown in FIG. 6. Even if the traction control is switched at time $t_1$ from OFF to ON, the main throttle opening coming from the main throttle opening sensor is high so that the reference acceleration to be computed on the basis of the main throttle opening is high. Since the shift control is based upon the high reference acceleration, it is removed from the realities so that the shift map changing control cannot be properly executed.

We will now describe an example of the control for the automatic transmission according to the embodiment of the invention.

To compute the reference acceleration, the E/G torque is linearly interpolated from the map, of FIG. 7 or FIG. 8 based on conditions, on the basis of the throttle opening and the E/G RPM. Next, a speed ratio [(Input RPM of T/M)/(E/G RPM)] is computed from the input/output RPM of the T/M, and the torque ratio corresponding to the speed ratio is determined from the map, see FIG. 9 for an exemplary map. Next, the T/M input torque is determined by multiplying the E/G torque by the torque ratio.

A first reference acceleration is determined from the following formula:

First Reference Acceleration = (T/M Input Torque × Gear Ratio ×

Diff. Ratio/Tire Radius − Running Resistance on Flat Road −

Gear Loss)/Vehicle Weight.

Here, the running resistance on the flat road is determined in terms of the vehicle speed, see FIG. 10 for an exemplary map, and the gear loss is determined from the map, see FIG. 11 for an exemplary map, at the gear ratio.

A second reference acceleration is determined by the following rounding calculation using the four preceding first reference acceleration values, as stored, and the present first reference acceleration:

Second Reference Acceleration =

First Reference Acceleration $(k-4)$ +

First Reference Acceleration $(k-3)$ +

First Reference Acceleration $(k-2)$ +

First Reference Acceleration $(k-1)$ +

First Reference Acceleration $(k)$]/5.

Hence, k-n indicates the n-th preceding value.

Hence, the reference acceleration is determined by the following rounding calculation from the corrected second reference acceleration and the reference acceleration preceding by one.

Here, the value (i.e., base offset) for the correction is determined by linearly interpolating the map, see FIG. 12 for an exemplary map, in terms of the gear stage and the throttle opening.

Reference Acceleration $(k)$ = [Reference acceleration $(k-1) \times 3$ +

(Second reference acceleration - Base Offset)]/4.

Here, k-n indicates the n-th preceding value.

Incidentally, the aforementioned correction is necessary for correcting the running resistance, the losses other than the gear loss, and the dispersion in the output torque of the individual engines.

The first actual acceleration is determined in the following manner. The first actual acceleration is determined by storing the four preceding vehicle speeds and by weighting and averaging the selected ones of the preceding and the present vehicle speeds, as follows:

First Actual Acceleration = {[Vehicle Speed $(k)$ -

Vehicle Speed $(k-4)$] $\times 2$ + [Vehicle Speed $(k-1)$ -

Vehicle Speed $(k-3)$]}/10.

A second actual acceleration is determined in the following manner. The second actual acceleration is determined by storing the preceding two first actual accelerations and by the following rounding calculation of the preceding two and the present first actual acceleration:

Second Actual Acceleration = [Actual Acceleration 1 $(k-2)$ +

Actual Acceleration 1 $(k-1)$ + Actual Acceleration 1 $(k)$]/3.

Here, k-n indicates the value preceding by n.

Hence, the actual acceleration is determined from the preceding actual acceleration and the second actual acceleration by the following rounding calculation:

Actual Acceleration $(K)$ = [Actual Acceleration $(k-1) \times 3$ +

Second Actual Acceleration]/4.

Here, k-n indicates the value preceding by n.

Figure 3:
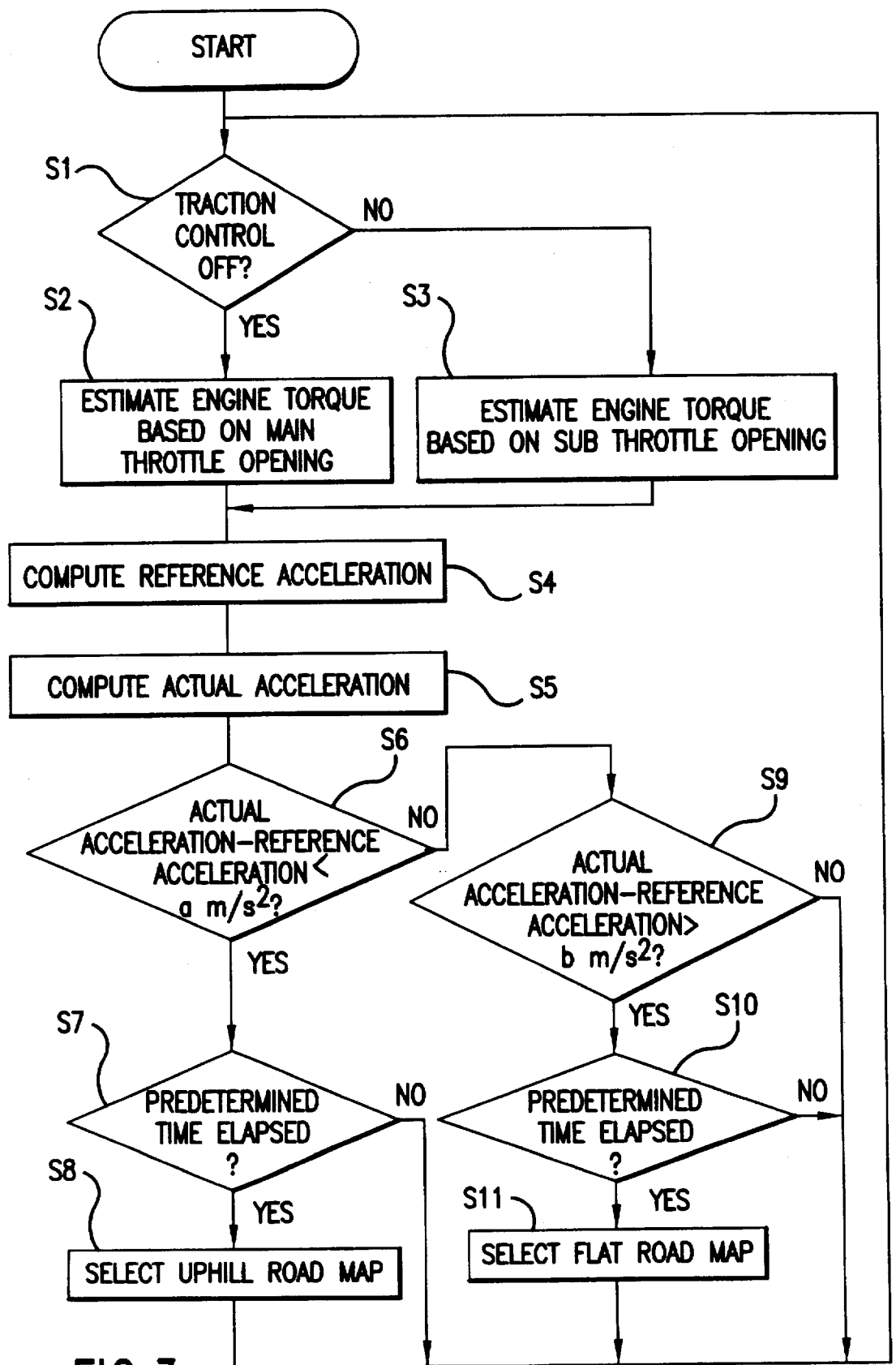
FIG. 3 is a flow chart of the control system for an automatic transmission according to the embodiment of the invention.

The control flow of the automatic transmission according to the embodiment of the invention will be described in detail with reference to FIG. 3.

First, it is decided at Step S1 whether the traction control is OFF.

If the determination is the traction control is OFF, the engine torque is estimated at Step S2 on the basis of the main throttle opening signal $S_4$ coming from the main throttle opening sensor 6.

If the traction control is ON at Step S1, on the other hand, the engine torque is estimated at Step S3 on the basis of the sub-throttle opening signal $S_5$ coming from the sub-throttle opening sensor 7.

Next, the reference acceleration is computed at Step S4 on the basis of the estimation of the engine torque at Step S2 or Step S3. Specifically, the E/G RPM signal $S_1$ of the E/G RPM sensor 3, the T/M input RPM signal $S_2$ of the T/M input RPM sensor 4, the vehicle speed signal $S_3$ of the vehicle speed sensor 5, and the main throttle opening signal $S_4$ or the sub-throttle opening signal $S_5$ of the main throttle opening sensor 6 or the sub-throttle opening sensor 7, respectively, and the brake switch signal $S_6$ of the brake switch 8 are fetched by the reference acceleration computing means 11 to compute the reference acceleration by the aforementioned formula of [Reference acceleration (k-1)× 3+(Second reference acceleration—Base Offset)]/4.

Next, the actual acceleration is computed at Step S5. Specifically, the vehicle speed signal $S_3$ of the vehicle speed sensor 5 is fetched by the actual acceleration computing means 12 to compute the actual acceleration by the aforementioned formula of [Actual Acceleration (k-1)×3+Second Actual Acceleration]/4.

The reason why the actual acceleration of the vehicle is determined by computing a plurality of accelerations for each predetermined time period and by rounding the resultant accelerations is as follows.

Specifically, if the acceleration is once computed and then is unchangedly employed as the actual acceleration of the vehicle, it is so seriously dispersed by the abnormal detection of sensors or by the incidental throttling operations of the driver that the shift maps are accordingly frequently changed to invite the deterioration of the drive feeling. By exemplifying the actual acceleration of the vehicle by the value which is achieved by computing a plurality of accelerations for each predetermined period and by rounding those accelerations, therefore, the dispersion of the actual acceleration can be reduced to achieve a stable change control of the shift maps and to prevent the deterioration of the drive feeling.

Next, it is decided at Step S6 whether the difference of the actual acceleration minus the reference acceleration is below a predetermined acceleration.

If the value of the actual acceleration—the reference acceleration is below the predetermined acceleration, that is, a m/s², e.g., −0.5 m/s², it is decided at Step S7 whether a first predetermined time, 2 seconds for example, has elapsed.

Figure 4:
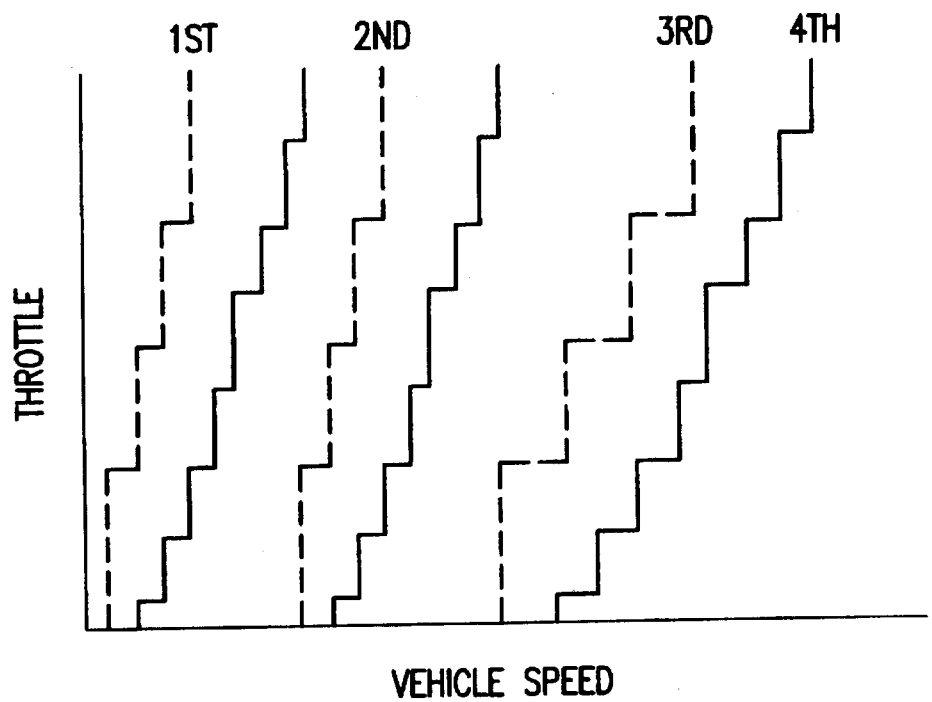
FIG. 4 is a diagram showing a shift map (or shift characteristics) for an uphill road according to the embodiment of the invention.

If this first predetermined time has elapsed, an uphill map, e.g., a shift map for an uphill, as shown in FIG. 4, is selected at Step S8 by the shift map deciding means 15.

If at Step S6 it is determined that the value of the actual acceleration—the reference acceleration is greater than the predetermined acceleration, it is decided at Step S9 whether the difference of the actual acceleration—the reference acceleration is greater than a second predetermined acceleration, that is, b m/s², e.g., −0.3 m/s².

If the answer to this decision is YES, it is decided at Step S10 whether a second predetermined time, 4 seconds for example, has elapsed.

Figure 5:
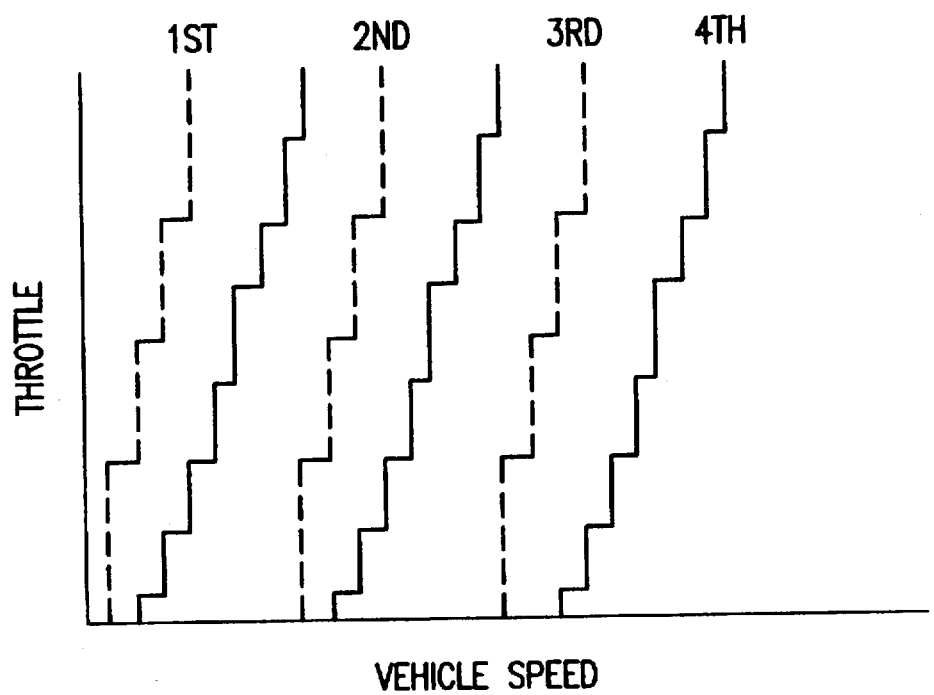
FIG. 5 is a diagram showing a shift map (or shift characteristics) for a flat road according to the embodiment of the invention.

If it is determined that the second predetermined time has elapsed, a flat road map, e.g., a shift map for a flat road, as shown in FIG. 5, is selected at Step S11 by the shift map deciding means 15. The major difference between the shift map for the uphill road and the shift map for the flat road is that the region for a 3rd speed is set wider for the uphill road shift map than for the flat road shift map.

If the answer in Steps S7, S9 or S10 is NO, the routine returns to Step S1.

Thus, according to the invention, the control system for an automatic transmission in which the running resistance of a vehicle is estimated on the basis of the vehicular running status including the input torque from the engine so that the shift characteristics are changed according to the running resistance, the running resistance of the vehicle is estimated on the basis of the vehicular running status and the action status of the sub-throttle valve, which acts independently of the driver's operation during slippage, or spinning, of the drive wheels, during the action of the engine output control means for reducing the output of the engine by the sub-throttle valve. As a result, during the action of the engine output control means, the input torque can be computed on the basis of the action status of the sub-throttle valve for controlling the output of the engine, so that the estimation of the running resistance of the vehicle is not mistaken.

Thus, it is possible to effect a reliable shift control even during the action of the traction control unit and to prevent the response delay of the decision of the hill road just after the end of the action of the traction control unit.

According to the invention, the running resistance of the vehicle is estimated on the basis of the reference acceleration, as computed from the running status, and the actual acceleration, and the shift characteristics are changed according to the result of the comparison between the estimated running resistance and the preset reference value. Thus, it is possible to estimate the running resistance accurately from the vehicular running status and to achieve a shift control matching the road gradient situations satisfactorily.

Further, according to the invention, the input torque from the engine is determined on the basis of the throttle opening of the main throttle and the engine RPM, and the reference acceleration is calculated on the basis of the input torque. The actual acceleration is calculated on the basis of the signal coming from the vehicle speed sensor. The running resistance of the vehicle is estimated on the basis of the reference acceleration and the actual acceleration so that the shift characteristics are changed according to the result of a comparison between the estimated running resistance and a preset reference value. In a control system thus structured for an automatic transmission, during the action of the engine output control means for reducing the output of the engine by the sub-throttle valve which acts independently of the operation of the driver at an overrun of the drive wheels, the reference acceleration is computed on the basis of the throttle opening of the sub-throttle and the engine RPM so that the running resistance is estimated on the basis of the reference acceleration and the actual acceleration. During the action of the engine output control means, the engine torque can be computed on the basis of the sub-throttle valve to make no mistake in the estimation of the running resistance of the vehicle. As a result, it is possible to effect reliable shift control even during the action of the traction control unit and to prevent the response delay of the decision of the hill road just after the end of the action of the traction control unit.

Lastly, according to the invention, the reference acceleration is computed by weighting and averaging the preceding reference accelerations and the present reference acceleration, and the actual acceleration is computed by weighting and averaging the preceding actual accelerations and the present actual acceleration. As a result, an advantage in disturbances such as noise can be achieved to control the change stably in the shift map thereby improving the drive feeling.

Incidentally, the invention is not limited to the foregoing embodiment but can be modified in various ways and the modifications are included within the scope of the invention.

What is claimed is:

1. A control system for an automatic transmission, comprising:

running status detecting means for detecting a running status of a vehicle, to include an input torque from an engine;

running resistance estimating means for estimating a running resistance on a basis of the running status of the vehicle, the running resistance including a road gradient;

shift characteristic changing means for changing shift characteristics in accordance with the running resistance of the vehicle;

engine output control means for reducing an output of the engine by controlling a sub-throttle valve which acts independently of a driver's operation at an overrun time of drive wheels; and action status detecting means for detecting an action status of said sub-throttle valve, wherein said running resistance estimating means estimates the running resistance of the vehicle on a basis of said running status detecting means detection of the running status of the vehicle and said action status detecting means detection of the action status of said sub-throttle valve during operation of the engine output control means.

2. A control system for an automatic transmission according to claim 1, further comprising:

reference acceleration computing means for computing an acceleration of the vehicle on a flat road based on the running status of the vehicle;

actual acceleration computing means for computing an actual acceleration of the vehicle based on the running status of the vehicle; and running resistance comparing means for comparing the estimated running resistance and a preset reference value, wherein said running resistance estimating means estimates the running resistance of the vehicle on the basis of the reference acceleration and the actual acceleration, and said shift characteristics changing means changes shift characteristics in accordance with a result of the comparison by the running resistance comparing means.

3. A control system for an automatic transmission according to claim 2, wherein the reference acceleration is computed by weighting and averaging preceding reference accelerations and a present reference acceleration, and the actual acceleration is computed by weighting and averaging preceding actual accelerations and a present actual acceleration.

4. A control system for an automatic transmission, comprising:

reference acceleration computing means for determining an input torque of an engine based on a throttle opening of a main throttle and an engine RPM thereby to compute a reference acceleration of a vehicle for a flat road on the basis of the input torque;

actual acceleration computing means for computing an actual acceleration of the vehicle on the basis of a signal from a vehicle speed sensor;

running resistance estimating means for estimating a running resistance of the vehicle on the basis of the reference acceleration and the actual acceleration;

running resistance comparing means for comparing the estimated running resistance and a preset reference value;

shift characteristics changing means for changing shift characteristics in accordance with a result of comparing by said running resistance comparing means;

engine output control means for reducing the output of said engine by a sub-throttle valve which acts independently of operation of a driver during slippage of drive wheels; and action status detecting means for detecting an action status of said sub-throttle valve, wherein during an action of said engine output control means, said reference acceleration computing means computes said reference acceleration from a throttle opening of said sub-throttle valve and the engine RPM, and said running resistance estimating means estimates the running resistance of the vehicle on the basis of the reference acceleration, as computed on the basis of the input torque determined based on the throttle opening of said sub-throttle valve, the engine RPM, and the actual acceleration.

5. A control system for an automatic transmission according to claim 4, wherein the reference acceleration is computed by weighting and averaging preceding reference accelerations and a present reference acceleration, and the actual acceleration is computed by weighting and averaging preceding actual accelerations and a present actual acceleration.

* * * * *